Figure 1:
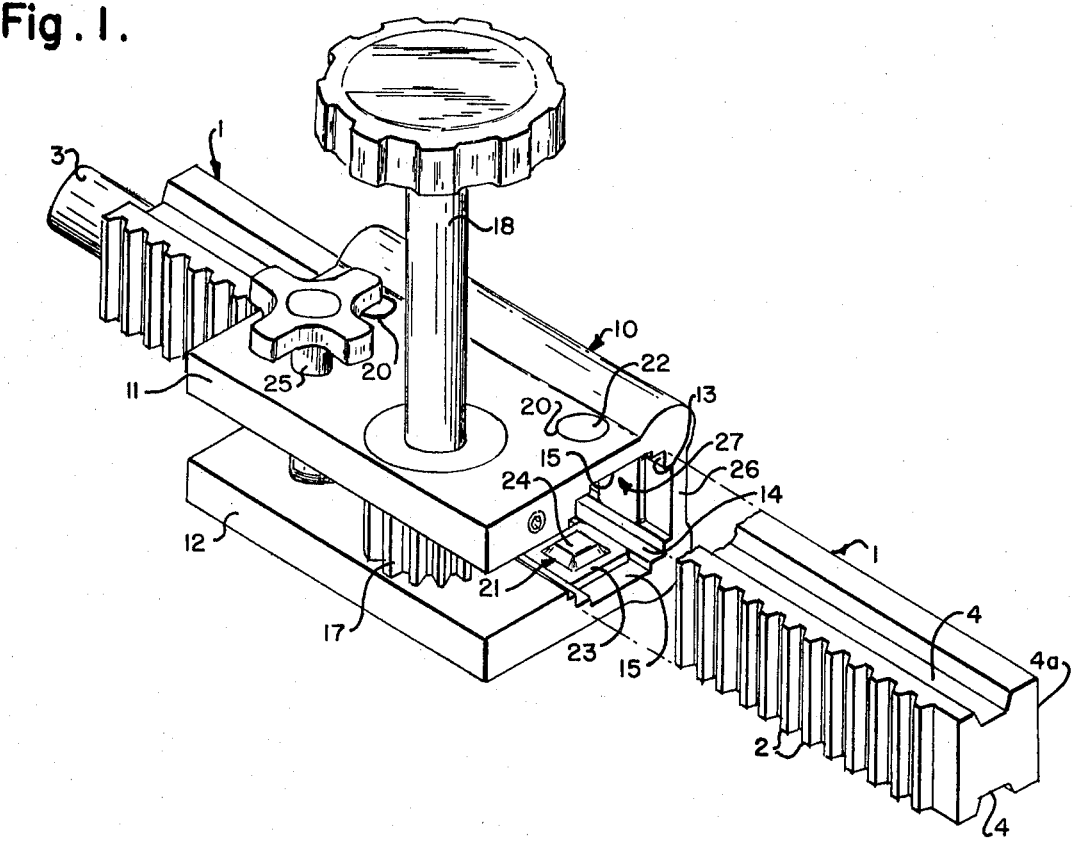

United States Patent
Cable et al.

[15] 3,656,364
[45] Apr. 18, 1972

[54] RACK AND HOLDER

[72] Inventors: H. Edward Cable, Thornburg; John A. Cable, Moon Township, both of Allegheny County, Pa.

[73] Assignee: Weld Tooling Corporation

[22] Filed: Dec. 2, 1970

[21] Appl. No.: 94,388

[52] U.S. Cl............................................................74/422
[51] Int. Cl........................................................F16h 1/04
[58] Field of Search..................................74/422, 424.6

[56] References Cited
UNITED STATES PATENTS

2,338,271  1/1944  Ulanet...........................................74/422
2,487,553  11/1949  Hunz.........................................74/422 X Primary Examiner—Leonard H. Gerin
Attorney—Buell, Blenko & Ziesenheim

[57] ABSTRACT

An improved rack and rack holder for cutting and welding torches, etc. wherein the rack includes a pair of tapered grooves throughout its length and the rack includes a pair of tapered elements cooperatively engaging said grooves.

2 Claims, 2 Drawing Figures

PATENTED APR 18 1972

3,656,364

INVENTORS
H. Edward Cable &
John A. Cable

*their attorneys*

RACK AND HOLDER

Our invention relates to a rack and rack holder and, in particular, to a rack and rack holder for cutting and welding torches.

It is common in the design of machines that carry flame cutting and welding torches to employ a movable rack and rack holder. The rack and rack holder provide a means of effecting lateral adjustment or movement to the torch. The racks are usually of a keyed round, square, hexagonal or rectangular cross-section cooperatively engaging a rack holder that includes a pinion or gear for driving the rack. These designs do not, however, permit a smooth lateral motion while at the same time providing a tight engagement between the gear and rack. The thrust of the gear against the rack does not provide enough force to eliminate all of the play from the extended tip of rack where the torch is located.

Attempts have been made to alleviate the problem which results in inaccurate cutting, bevelling, etc. For example, the cross-sections have been employed utilizing a hexagonal and octagonal design with a corresponding shape for the rack holder. While these designs do provide a degree of relief from the problem, they require expensive and difficult machining and casting.

We have been able to overcome this problem in a very straightforward manner. Our rack and rack holder are simple to fabricate yet substantially eliminate the problem described above. We provide an elongated rack having either a square or rectangular cross-section which includes a taper groove on the sides adjacent the side carrying the rack teeth. In the rack holder, we provide resilient plastic tapered guides that conform to the taper of the groove and which cooperatively engage the groove. The cooperation between the groove and the guide provides a clamping action for the torch holder that greatly facilitates adjustment of the tension in bearings for a firm hold yet retains a very smooth movement without undesired drag.

Figure 2:
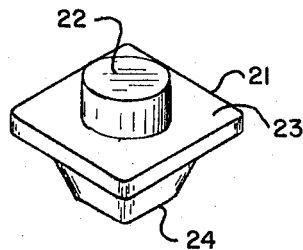

Other advantages of our invention will become apparent upon a perusal of the following detailed description taken in connection with the following drawing in which:

FIG. 1 is a perspective view of our rack and holder; and
FIG. 2 is a perspective view of the tapered guide.

Referring to FIG. 1, our invention comprises an elongated rack 1 made preferably from aluminum. The rack includes a plurality of teeth 2 along one side and substantially throughout the elongation. At one end of the rack, we prefer a cylindrical arrangement 3 for receiving a torch holder clamping means (not shown). Rack 1 includes a pair of tapered grooves 4 along its length, one each on opposite sides adjacent to the teeth.

We provide a rack holder 10 comprising a generally "U"-shaped configuration havings legs 11 and 12. Legs 11 and 12 have opposing channels 13 and 14, respectively, which are coextensive with their widths. Channels 13 and 14 include a coextensive recess 15 for receiving a glide member. Channels 13 and 14 are formed to cooperatively engage rack 1. Positioned between legs 11 and 12 and adapted to engage teeth 2 of rack 1, is pinion 17 which operably connected to shaft and handle 18. By rotation of pinion 17, rack 1 is moved through channels 13 and 14. Pinch means 25 is used to lock the rack from moving.

A pair of openings 20 are provided in each leg and communicate with the recesses 15 and the axis of opening perpendicularly bisects the center line of the recesses and channels. A member 21 is provided for each opening 20. On the bottom 26 of the rack holder, are an additional pair of openings similar to openings 20 for insertion of a flat tension guide or thrust member 27. Preferably, bottom 26 is provided with a recess similar to recesses 15 of the legs. Tension guide 27 abuts back 4a of rack 1.

Glide member 21 includes a cylindrical extension 22 having a diameter substantially the same as opening 20 into which it fits. A substantially flat square section 23 is dimensioned to fit snugly within recess 15. Extending from section 23 is a tapered element 24 that is dimensioned to conform with tapered grooves 4. Tension guide 27 can be a glide member without the tapered extension 24. Both are preferably made of a material such as nylon having resilience and low coefficient of friction against the aluminum rack surfaces.

While we have shown a presently preferred embodiment of our invention, it may otherwise be embodied within the scope of the appended claims.

We claim:

1. In a rack and rack holder for carrying cutting torches includes a U-shaped member having a pair of opposing legs internally spanned by opposing guideways, a rack for carrying at least one cutting torch and adapted to slidably mount within and between said guideways and means for slidably moving said rack, the improvement comprising a pair of opposing tapered grooves in and extending substantially the length of said rack, said grooves facing said guideway; and at least one pair of taper glides mounted in each of said guideway and cooperatively engaging said tapered groove.

2. The improvement set forth in claim 1 wherein said opposing legs include a recession in said guideways for mounting said readily replaceable tapered glides.

* * * * *